Figure 1:
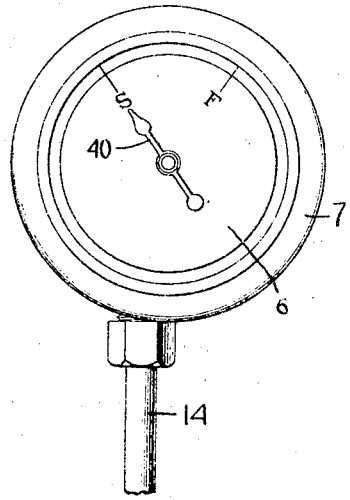

W. C. KNIGHT
OIL GAGE.
APPLICATION FILED NOV. 10, 1914.

1,197,580.

Patented Sept. 5, 1916.

Witnesses.
J. Morrill Fuller
William E. Gagen

Inventor.
William C. Knight
by Heard Smith & Tennant
Atty's.

UNITED STATES PATENT OFFICE.

WILLIAM C. KNIGHT, OF HIGHLAND PARK, MICHIGAN.

OIL-GAGE.

1,197,580.  Specification of Letters Patent.  Patented Sept. 5, 1916.

Application filed November 10, 1914. Serial No. 871,392.

*To all whom it may concern:*

Be it known that I, WILLIAM C. KNIGHT, a citizen of the United States, residing at Highland Park, county of Wayne, State of Michigan, have invented an Improvement in Oil-Gages, of which the following description, in connection with the accompanying drawing, is a specification, like characters on the drawing representing like parts.

This invention relates to oil gages such as are used to indicate whether the oil is flowing properly in the oiling system of an automobile or other machine, and particularly to an oil gage of that type in which the indication is made by means of a pointer moving over a dial.

The object of the invention is to provide a novel gage which is very simple in its construction and consequently inexpensive to manufacture, and which will accurately give the indication desired.

My improved gage comprises a casing having rotatably mounted therein an indicating pointer which operates over a dial, and means actuated by the pressure of the oil flowing through the system to determine the position of this indicator. The means herein illustrated for this purpose and which I consider to be practical includes a cylinder connected to the piping of the oiling system, a plunger in said cylinder which is subjected to the pressure in the oiling system, and means whereby movement of the plunger will move the pointer.

In order to give an understanding of my invention I have illustrated a selected embodiment thereof in the drawings which will now be described, after which the novel features will be pointed out in the appended claims.

Figure 2:
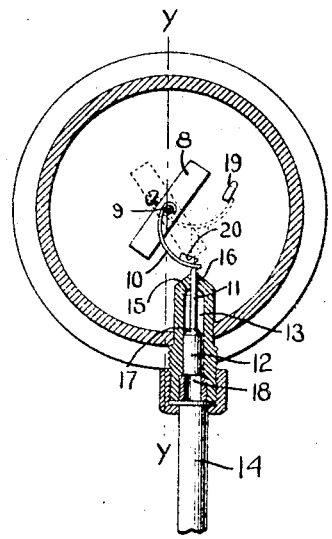
Figure 3:
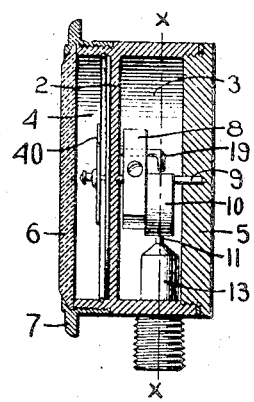

Figure 1 is a front view of a gage embodying my invention; Fig. 2 is a section on the line $x$—$x$, Fig. 3; Fig. 3 is a section on the line $y$—$y$, Fig. 2.

The gage comprises a casing 1 having mounted therein an indicating pointer 40 which is herein illustrated as situated within a chamber 4 having a transparent side so that the indicator is visible. This may be conveniently provided for by closing the side of the chamber 4 with a glass plate 6 which is secured to the casing 1 by a bezel 7. The casing has associated therewith a cylinder 13 in which operates a pressure-controlled actuator in the form of a plunger 12, said plunger having a stem 11 which extends through an opening 16 in the end of the cylinder and by which the indicator 40 is operated. So long as there is pressure in the pipe 14 the plunger 12 will be raised, but when there is no pressure in the oiling system the plunger 12 will occupy the full line position Fig. 2. Any suitable means will be employed for transmitting motion from the plunger 12 and stem 11 to the pointer 40. In the construction herein shown I interpose a magnet between these parts, the magnet being arranged to be operated by the movement of the stem 11 and in turn magnetically controlling the pointer 40. This particular construction is not essential, however, as any suitable connection or device for transmitting motion from the stem 11 to the pointer might be employed. The magnet is shown at 8 and it is in the form of a bar magnet which is mounted on a pivotal shaft 9 that is journaled in the end 5 of the casing and in a partition 2 extending across the casing and which divides the latter into the two chambers 4 and 3, one for receiving the pointer 40 and the other for receiving the magnet. The end 5 is shown as screw-threaded to the casing so that it can be removed. The shaft 9 or magnet 8 has an arm 10 extending therefrom which is adapted to be engaged by the stem 11, said arm preferably being counterweighted, as shown at 20, so that when the plunger is in its lowered position the counterweight will swing the magnet into the full line position Fig. 2. As stated above, the cylinder 13 is connected to the piping 14 of the oiling system, and said cylinder is formed at its upper end interiorly with a valve seat 15. The plunger portion of the actuator 12 is formed at 17 to constitute a valve to fit against the valve seat 16 when the plunger is raised.

The downward movement of the plunger is limited by any suitable stop, such as the plug 18 screw-threaded into the cylinder. When there is no oil flowing and no pressure in the oiling system, the plunger 12 will drop by gravity against the stop 18, thus withdrawing the stem 11 from the arm 10. The counterweight 20 on this arm is sufficient so that when the stem 11 is withdrawn it will turn the magnet into the full line position Fig. 1. When, however, there is pressure on the oiling system, the pressure against the plunger will raise the latter against the valve seat 15 thereby causing the stem 11 to act on the arm 10 and turn the magnet into the dotted line position Fig. 2, the movement of the magnet in this position being preferably limited by the stop 19. When the plunger is raised the engagement of the valve portion 17 with the valve seat 15 will prevent the passage of any oil from the piping 14 into the magnet-receiving chamber 3, and so long as the oil is flowing properly and there is the required pressure on the system the magnet will be held in this position. The indicating needle 40 follows the position of the magnet and, therefore, it will indicate whether the plunger is raised or lowered and consequently whether the oil is flowing or not. The partition 2 may have suitable legends placed thereon, such as the letters "F" and "S" (indicating the words "flow" and "stop") at the positions which the indicator 40 will assume when the plunger is raised and lowered, respectively, and, therefore, by simply reading the pointer it is possible to learn whether or not the oil is flowing properly.

The casing 1 can be placed in any suitable location on the automobile, such, for instance, as on the cowl-board, instrument-board, or any other place, and the cylinder 13 will be connected to the oiling system by the piping 14. The device is very inexpensive to manufacture. It will indicate accurately whether the oil is flowing or not and the construction is such that no oil can leak therefrom.

I claim:

1. In an oil flow gage, the combination with a casing having a magnet-receiving chamber, of a magnet rotatably mounted in said chamber, a cylinder member connected with the piping of the oiling system, a plunger operating in said cylinder and exposed to the pressure in the oiling system, a stem extending from said plunger and projecting through the end of the cylinder, a curved arm rigid with the magnet and loosely resting on the stem, and means to indicate the position of the magnet.

2. In an oil flow gage, the combination with a casing, of an indicator pivotally mounted in said casing, an indicator-controlling member also pivotally mounted in said casing, a curved arm rigid with said controlling member, a cylinder connected with the piping of the oiling system, a plunger operating in said cylinder and exposed to the pressure in said oiling system, and a stem extending from the plunger and projecting through the end of the cylinder, said stem loosely engaging said curved arm.

3. In an oil flow indicator, the combination with a casing having a magnet-receiving chamber, of a magnet rotatably mounted in said chamber, a cylinder member having a valve seat at one end thereof, a plunger in said cylinder having a valve to seat against said seat when the plunger is raised, a stem extending from the plunger and adapted to actuate the magnet, said plunger being exposed to the pressure of the oil in the system, and means to indicate the position of the magnet.

In testimony whereof, I have signed my name to this specification, in the presence of two subscribing witnesses.

WILLIAM C. KNIGHT.

Witnesses:
 Louis C. Smith,
 George P. Gregory.